INVENTOR.
MAARTEN VOOGD

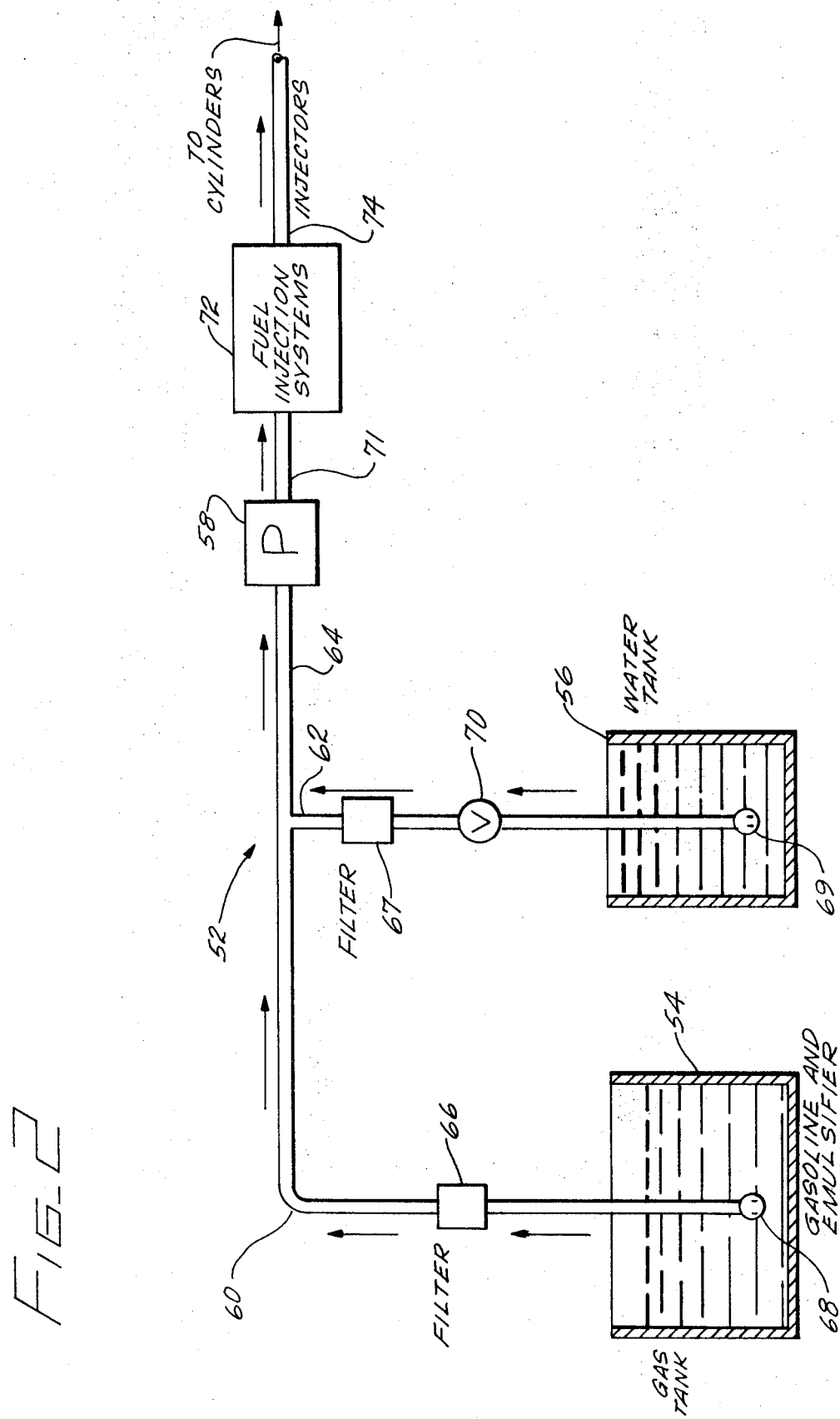

United States Patent Office 3,606,868
Patented Sept. 21, 1971

3,606,868
SMOG CONTROL SYSTEM EMPLOYING AN
EMULSION OF WATER IN GASOLINE
Maarten Voogd, 918 Palomar Road, Ojai, Calif. 93023
Filed May 14, 1970, Ser. No. 37,117
Int. Cl. F02d 19/00; C10l 1/32; F02m 25/02
U.S. Cl. 123—25R                                    5 Claims

ABSTRACT OF THE DISCLOSURE

A fuel system for reducing nitrogen oxides and carbon monoxide in the exhaust gas emissions of an internal combustion engine includes a storage tank for gasoline and a dissolved emulsifying agent, a storage tank for deionized water, and means for pumping controlled volumes of the gasoline and emulsifying agent and the water to an emulsifying chamber and thence to the engine. In one form of the invention, rotary stirring means within the emulsifying chamber emulsify the water in gasoline, and the emulsion is then introduced into the engine carburetor. Means provides for continuous, uninterrupted recirculation of a portion of the emulsion accumulated in the carburetor fuel chamber to the emulsifying chamber. In another form of the invention, a centrifugal pump emulsifies the water in the gasoline. The emulsion is then pumped into the engine cylinders by direct fuel injection. The emulsion substantially reduces the reaction temperature of gasoline and air in the engine cylinders, and thereby reduces the formation of nitrogen oxides which are a major cause of air pollution.

BACKGROUND OF THE INVENTION

Field of the invention

This invention relates to smog control, and more particularly to a fuel system for introducing an emulsion of water in gasoline into an internal combustion engine.

Description of the prior art

Atmospheric pollution, such as smog, is to a large extent formed by oxides of nitrogen and unburned or partially burned hydrocarbons in the exhaust gas emissions of automobiles. Actinic light makes these components reactive, and converts them to alkyl peroxy nitrates and ozone which cause lung and eye irritation. Smog prevention thus far has been concerned almost exclusively with the reduction of hydrocarbon emissions. A typical example is the crankcase vent emission, which now is being partially controlled.

SUMMARY OF THE INVENTION

I have developed a method and system for continuously introducing an emulsion of water in gasoline into an internal combustion engine. The presence of the water reduces the reaction temperature of the gasoline and air in the engine cylinders, with the result that the formation of nitrogen oxides is substantially reduced.

Briefly, my preferred system for introducing the gasoline-water emulsion in the engine comprises means for emulsifying water in gasoline, means for continuously delivering controlled volumes of gasoline and water to the emulsifying means, and fuel regulation means for continuously delivering the gasoline and water emulsion to the engine.

In the preferred form of the invention, the emulsifying means comprises an emulsifying chamber, and a rotary stirring device adapted to be driven so as to emulsify the water in the gasoline. Preferably, the volume control means includes a conduit for gasoline, a conduit for water, means for pumping the gasoline and water to the emulsifying chamber, and means for adjusting the relative flow in each conduit so that controlled amounts of water and gasoline are delivered to the chamber.

In one form of the invention, the fuel regulating means includes carburetor means having a fuel chamber for accumulating the emulsion, and a return line between the carburetor fuel chamber and the emulsifying chamber for returning partially separated gasoline and water to the emulsifying chamber. Thus, the gasoline and water emulsion within the carburetor fuel chamber is continuously maintained in its emulsified condition during operation of the engine. In another form of the invention, the fuel regulating means includes a system for injecting the emulsion under pressure directly into the engine cylinders.

BRIEF DESCRIPTION OF THE DRAWINGS

The above-mentioned and other aspects of the invention are more fully set forth in the following detailed description of the embodiments of the invention which are presently preferred, such description being with reference to the accompanying drawings, in which:

FIG. 2 is a schematic diagram of a system for delivering an emulsion of water in gasoline to the engine cylinder head by direct fuel injection.

DETAILED DESCRIPTION OF THE PREFERRED EMBODIMENTS

Figure 1:
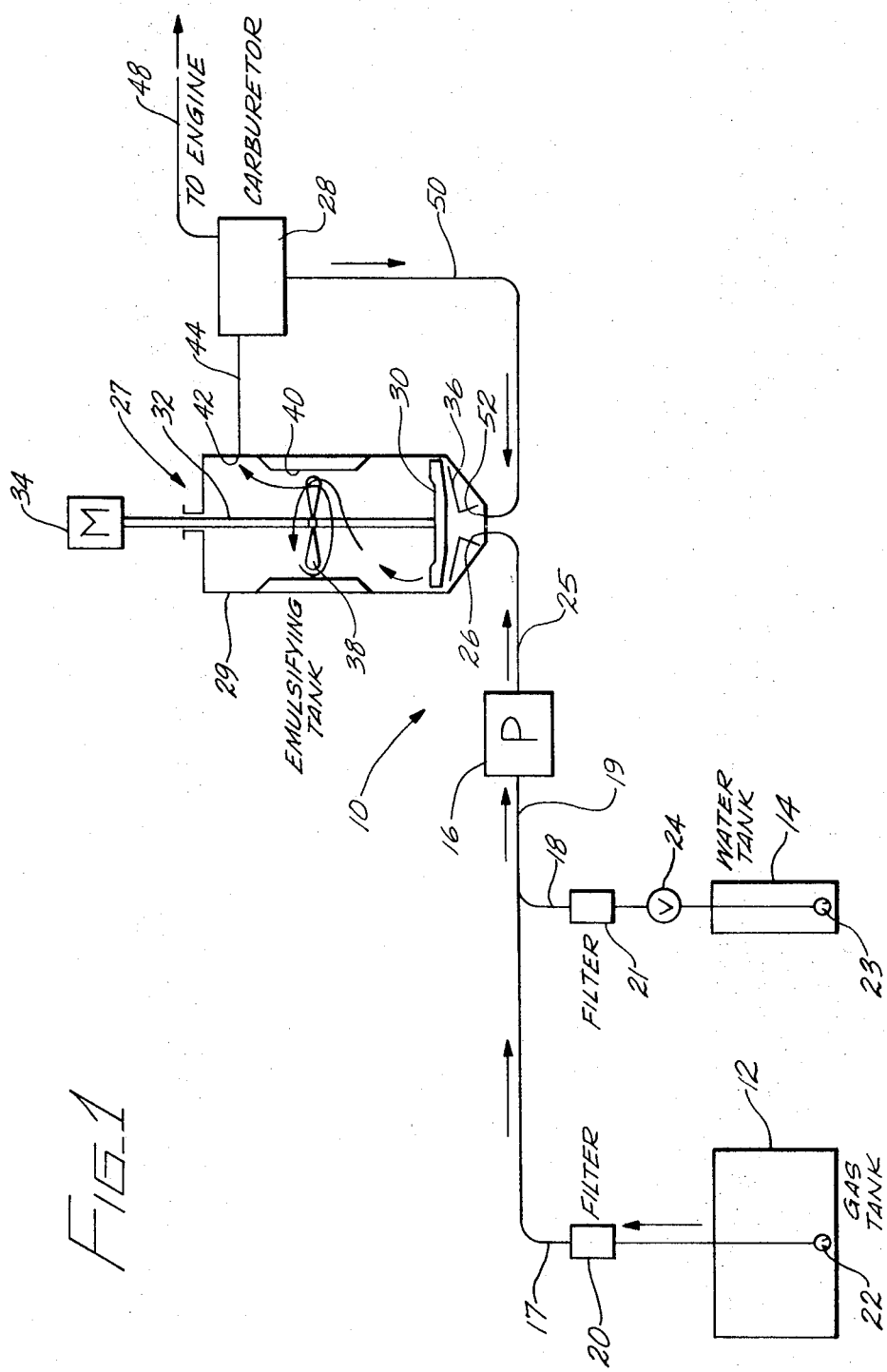
FIG. 1 is a schematic diagram of a system for delivering an emulsion of water in gasoline to a carburetor of an internal combustion engine.

This invention is based on the recognition that oxides of nitrogen are formed from the high temperature combustion reaction of conventional automobile fuels and air in the cylinders of internal combustion engines. It is further recognized that the higher the combustion temperature, the higher the concentration of nitrogen oxides in the engine exhaust gas. The exhaust gas emissions from internal combustion engines have a high concentration of nitrogen oxides because the high temperature explosion of conventional fuels and air and the immediate cooling are ideal conditions for the formation and stabilization of the nitrogen oxides formed in the combustion reaction. I have concluded that the formation of nitrogen oxides will be substantially reduced by a fuel system for internal combustion engines that effects a substantial reduction in the temperature of the combustion reaction in the engine cylinder head.

It is believed that the explosion of conventional automobile fuels and air in the engine cylinder chambers creates a temperature of about 3,500° F. The subsequent expansion, which creates the power, cools the combustion gases to a temperature of about 1,000° F. The resulting concentration of nitrogen oxides in the exhaust gas varies for different types of automobiles between about 1,000 and about 2,500 parts per million.

I have tested the performance of a conventional automobile engine by operating the engine on an emulsion of water in gasoline. The water and gasoline were thoroughly stirred within a pump so as to emulsify the water in the gasoline, and the emulsion was then delivered to the engine carburetor. Engine operation with the emulsion was very smooth, and the concentration of nitrogen oxides in the exhaust gas was found to be less than 100 parts per million. It is believed that this substantial reduction in nitrogen oxides was the result of a substantial reduction of the reaction temperature of gasoline and air in the engine cylinders brought about by the addition of the water to the gasoline. During the test, it was also found that the engine operates most effectively on an emulsion having a very fine dispersion of water droplets in the gasoline. Thus, it is believed that a fuel system that continuously introduces a finely dispersed emulsion of water in gasoline into the engine will substantially reduce the formation of nitrogen oxides in the exhaust gas so as to reduce to a large extent the formation of smog.

Furthermore, it has been found that the emulsification of the water in the gasoline substantially increases the octane rating of the gasoline to a level sufficient for high compression engines.

Since a mixture of gasoline and water separates rapidly, emulsifying agents such as water soluble alcohols or ketones, or suitable surfactants are added to the mixture to provide a relatively stable emulsion. In the preferred form of the invention, gasoline substantially free of other additives, such as white gas, with a surfactant concentration of less than about 1% by volume is mixed with water to form a fuel mixture in which the water concentration is less than about 20% by volume. The gasoline, emulsifying agent, and water mixture is then mixed within a reservoir or the like to form an emulsion, and the emulsion is then forced to flow from the reservoir to the engine.

In a conventional automobile engine, the emulsion is delivered to the carburetor. The emulsion within the carburetor fuel chamber is continuously maintained in its emulsified condition so that gasoline is continuously delivered to the engine cylinder chamber in the presence of water which reduces the combustion temperature of the gasoline and air in the cylinder chamber. The excess heat developed from the combustion of the gasoline is used for the evaporation of water to steam which produces power because of its own expansion in the cylinders.

Referring to FIG. 1, a fuel system 10 includes a conventional automobile gasoline tank 12 containing gasoline with dissolved emulsifier, and a separate water tank 14 containing deionized water. A conventional automobile fuel pump 16 has a gasoline suction line 17 disposed within gasoline tank 12 and a water suction line 18 disposed within water tank 14. Lines 17 and 18 join to discharge gasoline and water into a fuel line 19 leading to the fuel pump. A filter 20 filters the gasoline flowing in suction line 17, and a filter 21 filters the water flowing in line 18.

The relative volume of gasoline and water delivered to the fuel pump is controlled by adjusting the relative sizes of an orifice 22 in the gasoline suction line 17 and an orifice 23 in the water suction line 18, respectively. Further metering of the gasoline and water is provided by a valve 24 in line 18 for adjusting the flow rate of the water. Alternatively, the valve could be connected to line 17 instead of line 18, or an additional valve (not shown) could be connected to line 17.

Gasoline and water could also be stored in one gasoline tank. Since gasoline 7 and water are immiscible, they would normally maintain a separated condition in the tank, with water on the bottom and gasoline on top. A traveling upper pickup (not shown) in the tank would deliver gasoline to the engine, and a lower pickup (not shown) would deliver water to the engine. The gasoline and water would be appropriately mixed before entering the engine.

A fuel line 25 delivers gasoline and water from fuel pump 16 to an inlet port 26 at the bottom of an emulsifier 27 mounted adjacent to an engine carburetor 28. The emulsifier includes an emulsifying tank or chamber 29, and a propeller stirrer 30 connected to the end of an elongated upright shaft 32 disposed centrally within the emulsifying tank. The opposite end of the shaft 32 extends outwardly from the emulsifying tank and is coupled to an electric motor 34 which rotates the stirrer. Electric motor 34 is preferably operated from the conventional 12 volt automobile storage battery (not shown) present in the automobile. However, the motor can also be operated from a separate power supply. The motor is preferably driven at a speed of 3600 r.p.m. An upwardly tapered cylindrical draft tube 36 is disposed within the lower portion of emulsifying tank 29 above inlet port 26 and below the central portion of propeller stirrer 30. A second fan-type stirrer 38 is secured to an intermediate portion of rotary shaft 32, and a cylindrical deflector 40 having a vertical wall spaced slightly inwardly from the outer wall of the emulsifying tank 29 is disposed within an intermediate portion of the tank so as to encircle the second stirrer 38. An outlet port 42 in the upper portion of emulsifying tank 29 opens into a discharge line 44 connected to the carburetor 28.

In use, a mixture of water and gasoline is pumped to the lower portion of the emulsifying tank through inlet port 26. The gasoline and water are drawn upwardly through draft tube 36 into the center of propeller stirrer 30 by the suction created from the rotation of the stirrer. As the gasoline and water are continuously pumped into the lower portion of the emulsifying tank, the stirrer 30 discharges the liquid at its periphery, throwing it in an upward direction so as to emulsify the water in the gasoline. The emulsion is thrown toward the deflector 40 to channel the emulsion to the second stirrer 38 which in turn circulates the emulsion upwardly and outwardly toward outlet port 42. The emulsion flows through discharge line 44 into carburetor 28 to mix the emulsion with air in proper proportions in a conventional manner. The resulting fuel charge is drawn into the engine cylinder head through a fuel line 48 leading from the carburetor to the engine.

The emulsion in the emulsifying tank and in the carburetor fuel chamber tends to separate upon standing idle. To avoid this problem, a return line 50 connects the lower portion of the carburetor fuel chamber to an inlet port 52 at the bottom of emulsifying tank 29. During operation of the engine, the centrifugal action of the emulsifier sucks the fuel mixture in the lower portion of the carburetor fuel chamber back to the emulsifying tank through return line 50 to continuously recirculate the gasoline and water mixture so that partially separated gasoline and water is not introduced into the engine. The fuel pump 16 controls the flow through the emulsifier so that the amount of fuel returned from the carburetor is proportional to the amount of emulsion introduced into the carburetor fuel chamber through line 44.

The emulsion in emulsifying chamber 29 and in the carburetor fuel chamber separates completely when standing idle for a relatively long time, say during parking of the automobile overnight. The system is adapted to prevent partially separated gasoline and water from being introduced into the engine when the automobile engine is initially started. The ignition system is adapted to operate the motor 34 prior to starting the automobile engine to re-emulsify the water in the gasoline within the emulsifier and to circulate through return line 50. Other means for continuously maintaining the gasoline and water in its emulsified condition also can be used in conjunction with the system without departing from the scope of this invention.

FIG. 2 shows an alternative fuel system 52 including a conventional gasoline storage tank 54 for storing a mixture of gasoline with dissolved emulsifier, and a separate storage tank 56 for storing deionized water. An emulsifying pump 58 has a gasoline suction line 60 disposed within gasoline tank 54 and water suction line 62 disposed within water tank 56. The suction lines 60 and 62 join to deliver controlled amounts of gasoline and water to a fuel line 64 leading to the pump. A filter 66 filters the gasoline flowing to the pump, and a filter 67 filters the water flowing to the pump.

Volume ratio control of the gasoline and water is provided by adjusting the relative sizes of an orifice 68 in line 60 and an orifice 69 in line 62, respectively. Further volume ratio control is provided by the valve 70 in water suction line 62 for adjusting the flow rate of water into pump 58. Alternatively, the valve 70 could be connected to gasoline suction line 60 instead of line 62, or a separate additional valve (not shown) could be connected to suction line 60.

Emulsifying pump 58 is preferably a multi-stage centrifugal pump. The impellers within the pump are driven at a sufficiently high speed and in such a manner to create a sufficiently high turbulence to emulsify the water in the gasoline. The emulsion is then pumped through a discharge line 71 leading from the pump to a fuel injection system 72 which mixes the emulsion with metered amounts of air, and pumps the atomized fuel mixture through injectors 74 directly into the engine cylinders.

In practice, a standard eight-cylinder automobile engine with a compression ratio of 9.5 to 1 has been satisfactorily operated on emulsions of water and white gas. The test engine knocked slightly when operated on regular gasoline, and knocked severely with white gas alone. However, no knocking was observed when operated on the emulsion.

White gas is preferred because it contains none of the conventional gasoline additives that can cause the carburetor to foul when the engine is operated on an emulsion of water and gasoline that contains these additives.

To produce my preferred emulsion, I prefer to add an emulsifying agent to the white gas and water to produce a stable emulsion. By way of example, satisfactory emulsifying agents include surfactants such as alkylaryl ether alcohol, and alkylaryl polyether alcohol. I prefer to dissolve the surfactant in white gas so the surfactant concentration is less than about 1% by volume. Generally speaking, the surfactant concentration can vary, but surfactants are relatively expensive, so I prefer to use as low a concentration as possible, so long as a stable emulsion is produced when the water is added. Satisfactory results are obtained when the concentration of surfactant in white gas is 0.25%.

I thereafter mix the white gas and emulsifying agent with deionized water to obtain a fuel mixture in which the water concentration is preferably less than about 20% by volume. The preferred range is about 5% to about 10% by volume of water, because this particular mixture provides a substantial reduction in the combustion temperature, and at the same time contains a substantial volume of gasoline so that it operates smoothly in automobile engines of conventional design. The engine operates satisfactorily on water concentrations of up to about 50%, however.

Solvents such as water soluble alcohols and ketones can be added to the water phase of the emulsion to lower its freezing temperature. By way of example, satisfactory alcohols and ketones include methanol, ethanol, isopropyl alcohol, and alkylaryl polyether alcohol. It has been found that a clearer emulsion is obtained by the addition of these solvents.

Example I.—The above-mentioned standard eight-cylinder automobile engine with a compression ratio of 9.5 to 1 was operated on emulsions of water and white gas, in which the water concentration was varied between 0 and 10%. The engine ran smoother than when operated on conventional gasoline alone. No engine knocking was observed when operated on the gasoline-water emulsion. However, the engine knocked heavily on white gas alone, indicating that the addition of the water to the gasoline and the resulting lower temperature of combustion increased the octane performance of the engine. Less than 100 parts per million of nitrogen oxides were present in the exhaust gas, which is substantially less than the 1,000 to 2,500 parts per million concentration ordinarily produced by conventional automobile gasolines. The carbon monoxide concentration in the exhaust gas was between ¼% and ½%, which also represents a substantial reduction when compared with engine operation on conventional automobile gasolines. Initial operation of the engine showed considerable amounts of carbonaceous material in the exhaust gas. However, the carbon content of the exhaust gas subsided almost completely as the engine was continuously operated, thereby indicating that the addition of water to the white gas produced a substantial cleaning effect on the engine.

Example II.—The research engine was separately operated on emulsions of white gas with 2% and 4% water. Both emulsions contained less than 1% surfactant. Octane tests conducted with white gas alone produced a research octane number of 53.6. The emulsion with 2% water had a research octane number of 71.8, and the emulsion with 4% water had a research octane number of 72.1.

Example III.—About a month later, the research engine was separately operated on emulsions of white gas with 5% and 10% water. Both emulsions contained about 1% surfactant. In both cases the engine ran smoothly and no knocking was observed. The emulsion with 5% water had a research octane number of 74.6 and the emulsion with 10% water had a research octane number of 74.8.

What is claimed is:

1. In an internal combustion engine, a fuel system adapted to introduce an emulsion of water in gasoline to the engine, the system including means for storing gasoline and water, an emulsifying chamber, volume control means connected between the storage means and the emulsifying chamber for delivering to the emulsifying chamber controlled volumes of gasoline and water, means disposed within the emulsifying chamber for emulsifying the water in the gasoline, carburetor means having a fuel chamber in communication with the emulsifying chamber, means for delivering the emulsion from the emulsifying chamber to the carburetor fuel chamber where it accumulates, and means for continuously providing uninterrupted recirculation of a portion of the emulsion accumulated in the carburetor fuel chamber to the emulsifying chamber to prevent the gasoline and water from separating as they accumulate in the carburetor fuel chamber.

2. A system according to claim 1 wherein the emulsifying means includes rotary stirring means disposed within the emulsifying chamber adapted to be rotated so as to emulsify the water in the gasoline.

3. A system according to claim 2 wherein the recirculating means includes a return line having one end in direct communication with the carburetor fuel chamber, and another end in direct communication with the emulsifying chamber at a point which permits centrifugal action of the rotary stirring means to suck a portion of the emulsion accumulated in the carburetor fuel chamber back to the emulsifying chamber through the return line.

4. A system according to claim 2 including a motor operated separately from the engine for driving the rotary stirring means.

5. A system according to claim 1 wherein the emulsifying means includes an elongated rotary driven shaft; a propeller stirrer connected to the shaft and disposed so as to create suction within the emulsifying chamber to draw water and gasoline into the chamber, the propeller stirrer emulsifying the water in the gasoline as it rotates; and a rotary blade spaced from the propeller stirrer and connected to the rotary shaft for circulating the emulsion produced by the propeller stirrer from the emulsifying chamber to the carburetor means.

References Cited

UNITED STATES PATENTS

| | | | |
|---|---|---|---|
| 1,611,429 | 12/1926 | Fish | 123—25.3X |
| 1,614,735 | 1/1927 | Kirschbraun | 44—51 |
| 2,090,393 | 8/1937 | Roberts et al. | 44—51 |
| 2,152,196 | 5/1939 | Kokatnur | 123—1AUX |
| 2,461,580 | 2/1949 | Wiczer et al. | 44—51X |
| 2,550,982 | 5/1951 | Eberz | 44—51X |
| 2,873,182 | 2/1959 | Kosmin | 44—51 |
| 2,892,694 | 6/1959 | Weeks | 44—51 |
| 2,920,948 | 1/1960 | Weeks | 44—51 |

AL LAWRENCE SMITH, Primary Examiner

U.S. Cl. X.R.

44—51; 261—18A, 36A